United States Patent
Smith et al.

(10) Patent No.: US 12,462,553 B1
(45) Date of Patent: Nov. 4, 2025

(54) SELF-DIAGNOSTIC FIDUCIAL CLASSIFIER FOR MOBILE ROBOTS

(71) Applicant: Amazon Technologies, Inc., Seattle, WA (US)

(72) Inventors: Nicholas A Smith, Medford, MA (US); Lars Petter Johnsen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 18/235,042

(22) Filed: Aug. 17, 2023

(51) Int. Cl.
| | |
|---|---|
| *G06V 10/98* | (2022.01) |
| *G05D 1/00* | (2006.01) |
| *G06T 7/73* | (2017.01) |
| *G06V 10/764* | (2022.01) |
| *G06V 10/82* | (2022.01) |
| *G06V 20/50* | (2022.01) |

(52) U.S. Cl.
CPC .......... *G06V 10/98* (2022.01); *G05D 1/0234* (2013.01); *G06T 7/73* (2017.01); *G06V 10/764* (2022.01); *G06V 10/82* (2022.01); *G06V 20/50* (2022.01); *G06T 2207/20084* (2013.01); *G06T 2207/30204* (2013.01)

(58) Field of Classification Search
CPC ...... G06V 10/98; G06V 10/764; G06V 10/82; G06V 20/50; G05D 1/0234; G06T 7/73; G06T 2207/20084; G06T 2207/30204
See application file for complete search history.

(56) References Cited

U.S. PATENT DOCUMENTS

| | | | |
|---|---|---|---|
| 11,315,258 B1* | 4/2022 | Anagnostopoulos | ........................ A01B 69/001 |
| 2005/0029029 A1* | 2/2005 | Thorne | ............... G05D 1/0274 180/167 |
| 2019/0302879 A1* | 10/2019 | Schwarz | ............... G06F 3/0414 |
| 2020/0012829 A1* | 1/2020 | Davidson | ............. G05D 1/0234 |
| 2020/0338741 A1* | 10/2020 | Voorhies | ............... B25J 9/1692 |
| 2022/0414925 A1* | 12/2022 | Parian | ................. G06V 20/647 |
| 2023/0117821 A1* | 4/2023 | Ivie | ...................... G06V 20/698 382/128 |
| 2024/0118713 A1* | 4/2024 | Dean | ..................... G05D 1/247 |

* cited by examiner

*Primary Examiner* — Keith D Bloomquist
(74) *Attorney, Agent, or Firm* — Kilpatrick Townsend & Stockton LLP

(57) ABSTRACT

Techniques for mobile robots performing self-diagnostic fiducial classification are described herein. For example, a mobile robot can determine that an expected fiducial marker has not been detected as the mobile robot navigates via fiducial markers on a surface. In response, the mobile robot can generate an input to a machine learning model that can be executed on the mobile robot. The input can include images of the surface captured by the mobile robot. The machine learning model may be trained to generate an output comprising a classification of image data of the images based at least in part on the input. The mobile robot can determine an error event corresponding to the expected fiducial marker based at least in part on the classification of image data received from the machine learning model. The mobile robot can output a notification indicating the error event corresponding to the expected fiducial marker.

20 Claims, 11 Drawing Sheets

SELF-DIAGNOSTIC FIDUCIAL CLASSIFIER FOR MOBILE ROBOTS

BACKGROUND

An industrial robot is an electro-mechanical machine that is controlled by a computer program, electronic circuits, or both. The industrial robot may be either stationary or mobile (e.g., capable of navigating from one location to another location). For instance, the mobile robot may have wheels (or another form of conveyance) to enable the mobile robot to navigate to different locations. Mobile robots may be capable of performing activities using one or more arm-like mechanisms to grasp an item, release the item, etc.

BRIEF DESCRIPTION OF THE DRAWINGS

Various embodiments in accordance with the present disclosure will be described with reference to the drawings, in which.

DETAILED DESCRIPTION

Figure 1:
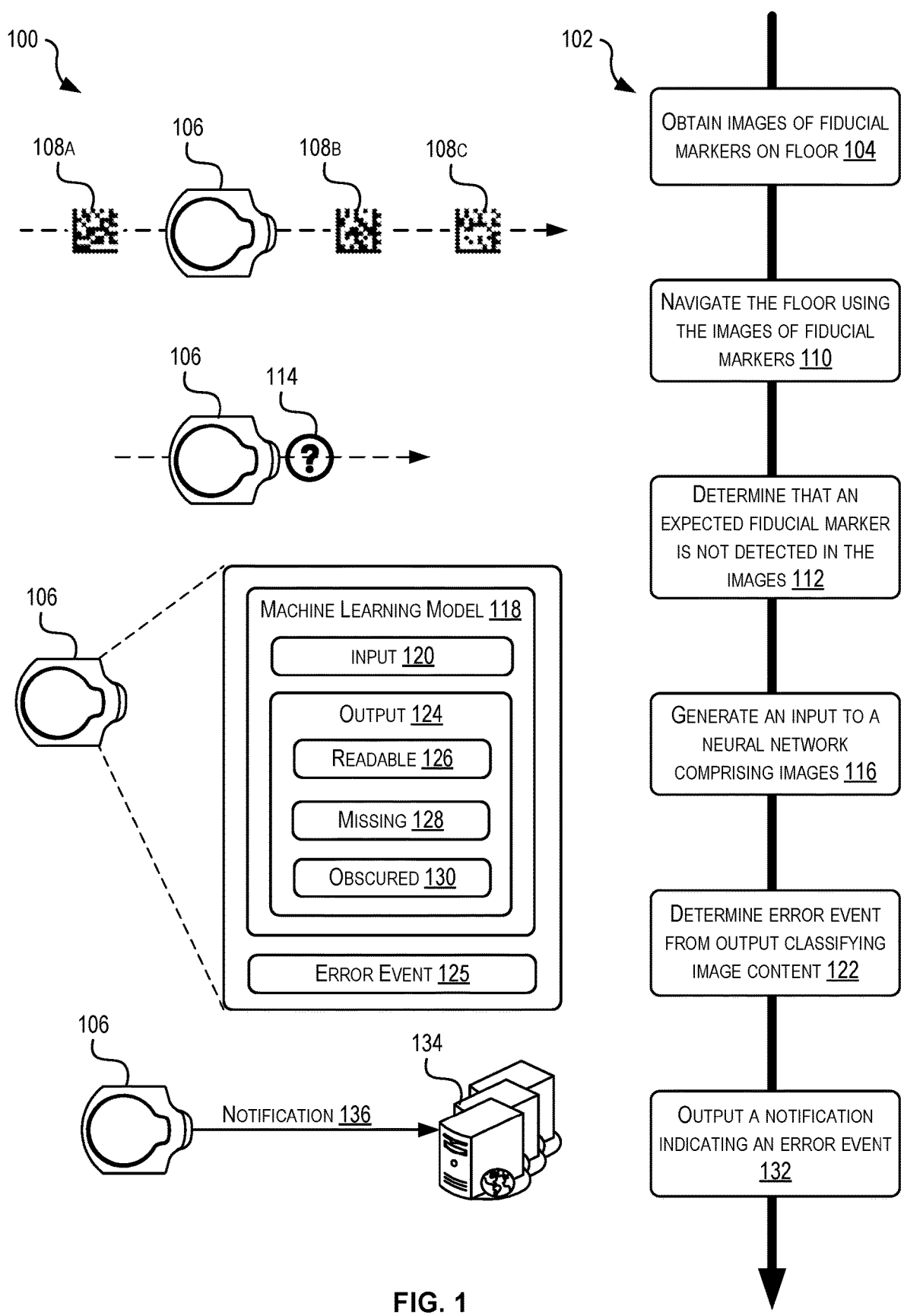
FIG. 1 is an example block diagram of a system and associated flowchart showing a process for implementing techniques relating to mobile robots performing self-diagnostic fiducial classification, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, mobile robots performing self-diagnostic fiducial classification. Mobile robots, such as differential-drive robots, can interact with inventory holders, totes, or other package resources in a semi-structured environment. The mobile robots can transport these resources from one physical location to another in a complicated orchestration of humans, software, and drive unit activities. In some examples, global position of the mobile robots and other environmental components can be periodically re-established via optical telemetry derived from image data (e.g., two-dimensional grayscale images of specialized stickers), such as fiducial markers. This is a mechanism that can be essential to reliable execution of the mobile robot, as it allows for periodic rejection of error that accumulates from other sensing modalities (e.g., wheel encoders, inertial navigation sensors, etc.). Detecting fiducial markers can also enable resynchronization of global robotic position against known global waypoints.

In some cases, repeated failure by a mobile robot to discover these fiducial markers may result in drive unit disablement. Thus, embodiments described herein involve a machine learning model (e.g., an artificial intelligent algorithm, a neural network, or other suitable machine learning model) running in situ on the drive unit firmware (e.g., edge-computing) that can automatically, and without human intervention, consume the image data normally utilized for the purposes of optical photogrammetry (e.g., two-dimensional grayscale images). The machine learning model can classify error events causing instances of missed fiducials in cases of absent stickers (e.g., gross navigation failure, slip, collision, etc.) and optical obstruction (e.g., dropped product, dust, lens fixture chafe, etc.) within the optical stack or in the observed scene. Thus, the mobile robot can perform reliable self-diagnosis of robotic failure relating to fiducial markers.

Turning now to a particular example, in this example, a mobile robot can navigate a facility such as a warehouse or factory to perform tasks (e.g., transport inventory holders, pallets, and the like). The mobile robot can include a floor-facing optical sensor that can capture two-dimensional images of the floor. Stickers such as fiducial markers may be placed on the floor by an operator to aid navigation. For example, the mobile robot may be tasked with transporting an inventory holder from a first location to a second location. The mobile robot may expect to detect images of a sequence of fiducial markers while navigating from the first location to the second location. If one or more of the fiducial markers are not detected in the images as expected, this can indicate an issue with the mobile robot or the facility environment. There may be multiple possible root causes for missing a fiducial marker, such as debris covering the floor, debris covering the optical sensor, the fiducial marker being damaged or removed entirely (e.g., ripped up), the mobile robot navigating incorrectly, etc.

To identify the issue, the mobile robot can input images detected by the optical sensor at the time that the mobile robot expected to detect the fiducial marker into a trained machine learning model executed locally by the mobile robot. For example, when a missed fiducial marker is detected, the mobile robot can automatically input a preset amount of most recent images (e.g., the last ten images), or images taken in a most recent preset amount of time (e.g., the last ten seconds), into the machine learning model. The machine learning model can use the images to classify a type of error event corresponding to the missing fiducial. In an example, the machine learning model can classify the images as including debris on the floor. The debris may be a liquid spill, a package fallen from an inventory holder carried by a mobile robot, dirt, or any other kind of debris. In some examples, the machine learning model may be trained to identify the type of debris. The mobile robot can then output the classification of the error event to, for example, an operator that can resolve the issue by removing the debris from the floor. The classifications can be used to make reliable diagnostics about problems with individual mobile robots or localized regions of the facility. Additionally, aggregated classification data from multiple robots in the facility can be used to diagnose facility-wide issues and mitigate environmental or manufacturing risks. For example, if multiple robots transmit notifications of an absent fiducial marker to an external computer system, the computer system may determine that the fiducial marker may have been ripped up or otherwise damaged from debris and/or mobile robots passing over it.

Embodiments of the present disclosure provide various technological advantages over conventional techniques for diagnosing root causes of missed fiducial markers. Conventional techniques may involve human operator intervention to diagnose and correct any environmental problems (e.g., drive slips, collisions, unexpected obstacles, etc.) before re-enabling the drive unit so the mobile robot can return to a productive state. This can represent a substantial operational cost, involving not only manual effort in drive recovery but labor-intensive post-mortem analysis of single drive unit failures, or wider data analysis to explain widespread problems. Because there can be multiple root causes for the same event (e.g., a missed fiducial marker), conventional techniques involve inferring the true cause based on historic event data from multiple mobile robots over a significant amount of time. This introduces uncertainty, slows down response time, and forces operators to choose between gains in sensitivity at the expense of specificity, or vice versa. Embodiments described herein can allow for individual mobile robots to quickly and locally identify the true root cause of failure to provide operators with near real-time insight into the state of mobile robots and facility zones. This can allow for more accurate fiducial marker replacement and improved efficiency in removing debris. For example, areas with higher levels of debris notifications from mobile robots can be targeted for floor cleanings. Floor maintenance can be shifted from a scheduled-based solution to a clean-as-needed policy.

Embodiments described herein can also provide advantages over conventional techniques by locally executing the machine learning model on the mobile robots to perform self-diagnostic fiducial classification, rather than executing the machine learning model on an external server. This can allow images captured by the mobile robot to be directly inputted into a machine learning model instead of being transmitted via a network. Thus, network bandwidth and computing resources of external servers can be conserved. And, because images are not transferred externally, the mobile robot can more quickly determine error events compared to conventional techniques.

Embodiments described herein can also cause gains in both sensitivity and specificity compared to conventional techniques, as fiducial markers may only be flagged for replacement based on data from images with either no fiducial present or a visible, poor-quality fiducial. Other operator workflows may be initiated for certain error events. For example, when mobile robots repeatedly classify a fiducial marker in a location as missing, a priority work order can be issued, allowing operators to prioritize locations most urgently in need of replacements. In another example, the fiducial quality metric for a particular fiducial marker may only be updated on fiducial reads where the mobile robot determines that no debris is present, either because the fiducial marker was successfully detected or because the machine learning model identified a present fiducial marker in the image. Replacement work orders can therefore be issued based on a more reliable quality metric, which can eliminate the need for a complex algorithm that considers surrounding issues from other mobile robots.

Turing now to the figures, FIG. 1 is an example block diagram of a system 100 and associated flowchart showing a process 102 for implementing techniques relating to mobile robots performing self-diagnostic fiducial classification, according to embodiments of the present disclosure. The system 100 includes devices, objects, and the like that correspond to the process 102. The process 102 can be performed by a mobile robot 106.

Figure 10:
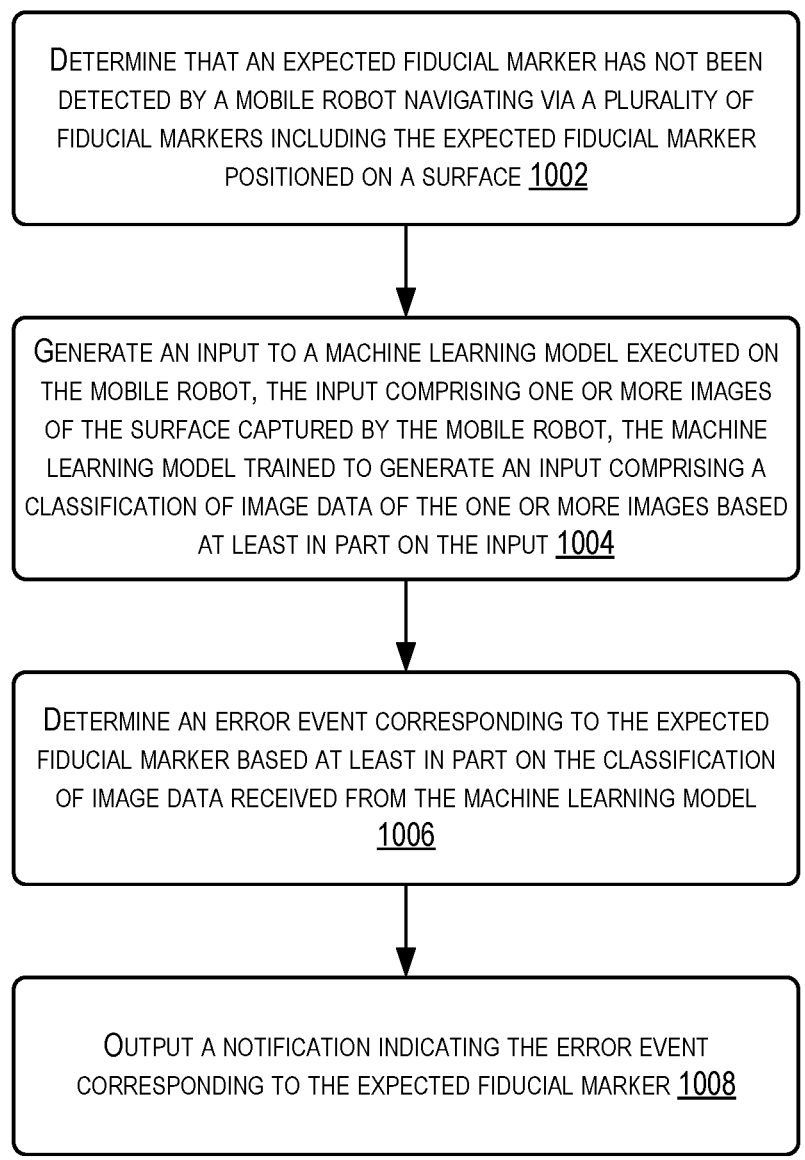
FIG. 10 is an example flowchart showing a process for implementing techniques related to mobile robots performing self-diagnostic fiducial classification, according to embodiments of the present disclosure.

FIGS. 1 and 10 illustrate example flow diagrams showing respective processes 102 and 1000, as described herein. The processes 102 and 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 102 or 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 104 by a mobile robot 106 obtaining images of fiducial markers 108a-c on a floor of a facility. The mobile robot 106 may be transporting resources (not depicted) from a first location in the facility to a second location. The mobile robot 106 can include a camera or other optical sensor on an underside of the mobile robot 106. The camera may capture an image, such as a two-dimensional grayscale image, of the floor at periodic intervals (e.g., once every second). As the mobile robot 106 passes over a fiducial marker 108, the image captured by the camera can depict the fiducial marker 108. Each fiducial marker 108a-c can indicate its global position within the facility (e.g., encoded into the fiducial marker 108).

At block 110, the mobile robot 106 can navigate the floor using encoded information derived from the images of the fiducial markers 108a-c. The mobile robot 106 may also use other methods to navigate (e.g., using wheel encoders to do relative trajectory updates), but such methods may accumulate error over time. Thus, detecting fiducial markers 108a-c in captured images can be used to indicate global position. The mobile robot 106 can be aware of the expected fiducial markers 108a-c when moving from the first location to the second location. For example, a route planning algorithm used to plan a route from the first location to the second location may output an ordered set of fiducial markers 108 for traversing the facility from the first location to the second location.

The mobile robot 106 may navigate from fiducial marker to fiducial marker according to the ordered set of fiducial markers 108 to maintain the correct route. For example, the mobile robot 106 may start navigation near the first fiducial marker 108a. When the mobile robot 106 passes over the first fiducial marker 108a, the mobile robot 106 can obtain an image of the first fiducial marker 108a. The mobile robot 106 can identify the encoded navigational information (e.g., global location) of the first fiducial marker 108a (and therefore the mobile robot 106) from the image. Based on the global location, the mobile robot 106 may continue on a trajectory to execute the route to the second fiducial marker 108b. The trajectory may include an estimated location of the second fiducial marker 108b according to the set of fiducial markers 108. When the mobile robot 106 reaches the estimated location of the second fiducial marker 108b, the mobile robot 106 may obtain images of the floor to detect the second fiducial marker 108b. If the second fiducial marker 108b is detected in the images, this can confirm that the mobile robot 106 is executing an accurate trajectory for the route. The mobile robot 106 can then continue executing the trajectory to reach the third fiducial marker 108c. If the second fiducial marker 108b is not detected in the images, an error event may have occurred.

At block 112, the mobile robot 106 can determine that an expected fiducial marker 114 has not been detected in the images. There may be several potential root causes for not detecting the expected fiducial marker 114. For example, the mobile robot 106 may have incorrectly navigated away from the fiducial marker 114 due to various reasons, such as accumulated error from other navigation methods, collisions with mobile robots or other objects in the facility, slip, errors with the drive unit, etc. In some examples, debris may be covering the expected fiducial marker 114 and preventing detection. In other examples, the camera may be malfunctioning or covered in debris. In some examples, the root cause may be due to degradation or removal of the expected fiducial marker 114, which may be ripped off the facility floor over time or suffer other damage.

At block 116, the mobile robot 106 can generate an input 120 to a machine learning model 118. In some examples, the machine learning model 118 may be a neural network. The input 120 can include a set of images recently captured by the mobile robot 106. The machine learning model 118 may be locally executed on the mobile robot 106 (e.g., not executed on another computer system connected to the mobile robot 106). The machine learning model 118 can be trained with images depicting readable and non-readable fiducial markers. In one example, the machine learning model 118 can be trained with a set of 100,000 images labeled as depicting a present fiducial marker, a portion of a fiducial marker, a missing fiducial marker, and debris. In other examples, the machine learning model 118 may be trained using a greater number or smaller number of images. The images can be manually or automatically (e.g., using another neural network) labeled. For example, neural network classifications that fail to meet a set confidence threshold can be returned for manual labeling to be later used to retrain the machine learning model 118. This process can continue until all the images are labeled. In one example, the machine learning model 118 can be run on a TI cortex-A15 processor embedded in the electronics of the mobile robot 106.

The input 120 can include a number (e.g., five) of the most recent images captured by the camera of the mobile robot 106. In some examples, the input 120 can include images captured in a most recent amount of time (e.g., captured in the last thirty seconds). In some examples, the mobile robot 106 can down sample the image resolution to generate the input 120. For example, the mobile robot 106 may reduce the input resolution of a dataset of images to 56×88 pixels, a larger resolution, or a smaller resolution. This number of pixels can be easily divisible by two to facilitate the stacking of several odd-dimensioned convolutional layers. Such a resolution is still large enough that a human may recognize the content of the image. Smaller inputs can allow for larger datasets due to the memory constraints of the mobile robot 106, which can minimize impact on performance accuracy. As fiducial markers are generally textureless, the loss of detail from down sampling may not be relevant to classification by the machine learning model 118.

At block 122, the mobile robot 106 can determine an error event 125 corresponding to the expected fiducial marker 114 based at least in part on an output 124 from the machine learning model 118 classifying the image data in the images. For example, the output 124 may classify the expected fiducial marker 114 as readable 126, missing 128, or obscured 130. A fiducial marker classified as readable 126 may indicate that the images did depict the expected fiducial marker 114 that the mobile robot 106 was unable to identify (e.g., an error event 125 due to a software error). Non-readable fiducial markers may be classified as missing 128 (e.g., an error event 125 due to a navigation error) or obscured 130 (e.g., an error event 125 due to the presence of debris on the floor or on the camera of the mobile robot 106). In other examples, the machine learning model 118 may be trained to classify additional types of image data (e.g., types of debris, levels of damage to fiducial markers, partially missing fiducial markers, etc.).

In an example, the machine learning model 118 may be trained to classify images with a high average precision when compared to floor conditions inspected by operators. The high degree of precision can come at the expense of the ability of the machine learning model 118 to apply labels to all images. If the confidence score for a given image fails to meet a threshold, the image may be labeled "inconclusive," preventing any action from being taken. However, the cost of a false positive prediction may far outweigh the benefit of a true positive prediction. In some examples, a third of images may fail to meet confidence thresholds. But images failing to meet confidence thresholds may not mean that the machine learning model 118 has failed to classify a third of all missing or obscured fiducial markers. In fact, low confidence classification can stem from environmental factors such as lighting and shifting debris. A slight change in fiducial marker surroundings caused by a moved inventory holder or a passing mobile robot may be enough to produce the single, high confidence image that the machine learning model 118 can use to appropriately label the location. When a classification is eventually applied to a particular fiducial marker 108 (e.g., as being missing, damaged, obscured by debris, etc.), the conservative confidence thresholds can ensure that the classification will likely be an accurate representation of the state of the fiducial marker 108.

At block 132, the mobile robot 106 can output a notification 136 to computer system 134 indicating the error event 125 corresponding to the expected fiducial marker 114. In some examples, the notification 136 can include a generated recommendation for an operation to execute to address the error event 125. For example, the mobile robot 106 can recommend that the mobile robot 106 be repositioned or that the expected fiducial marker 114 be replaced if classified as missing 128. In another example, the mobile robot 106 can recommend that debris be cleared from the mobile robot 106 or the area of the facility around the expected fiducial marker 114 if classified as obscured 130.

Figure 2:
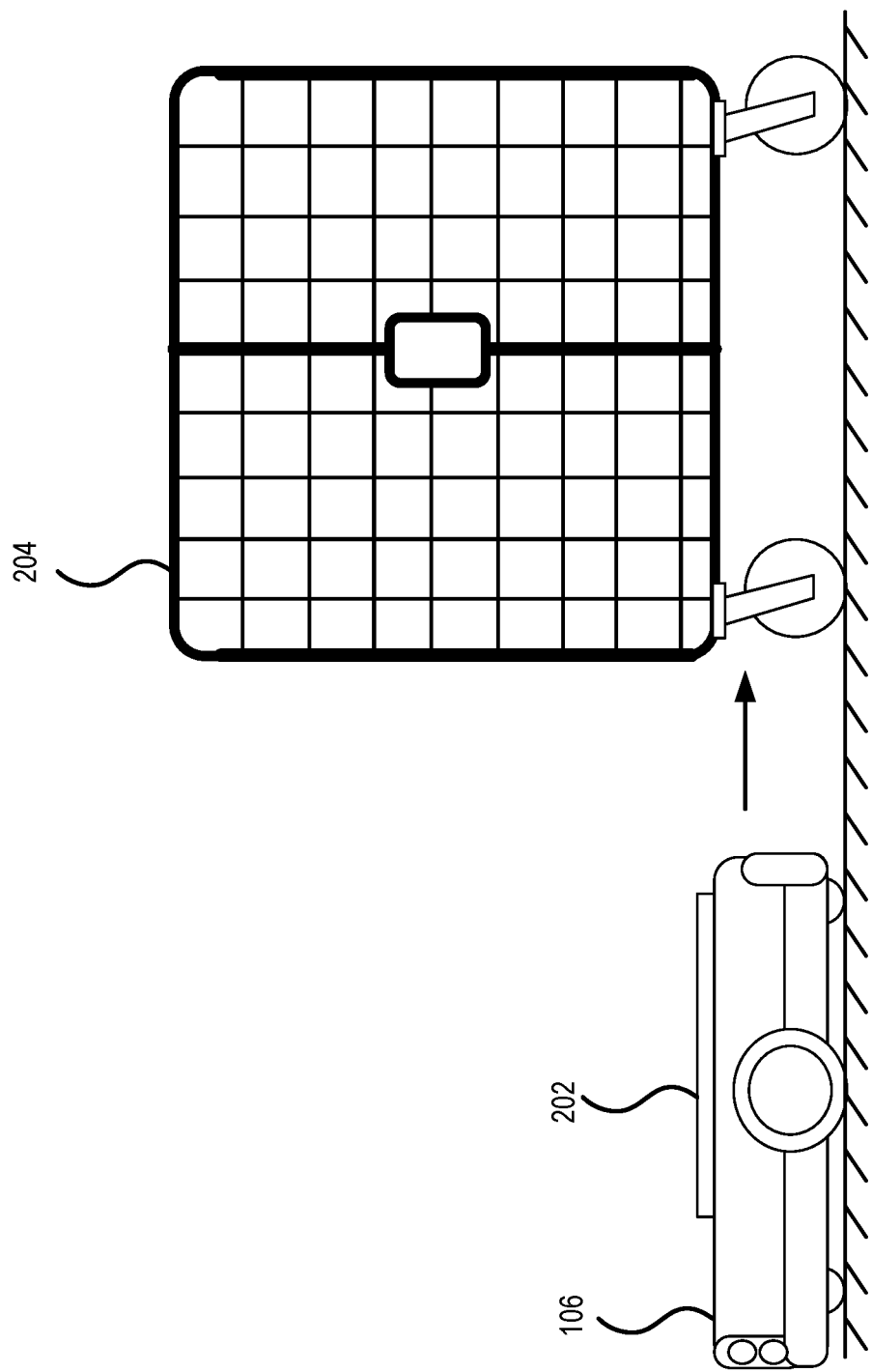
FIG. 2 illustrates an example of a side view of a mobile robot that can perform self-diagnostic fiducial classification, according to embodiments of the present disclosure.

FIG. 2 illustrates an example of a side view of a mobile robot 106 that can perform self-diagnostic fiducial classification, according to embodiments of the present disclosure. Specifically, FIG. 2 illustrates the operation of the mobile robot 106 with respect to a cart 204. Generally, the mobile robot 106 may move underneath the cart 204 and then lift the cart 204 to move or transport the cart 204. In the example of FIG. 2, the mobile robot 106 includes a platform 202. When the mobile robot 106 moves underneath the cart 204, the mobile robot 106 can raise the platform 202 to lift the cart 204. After the cart 204 is lifted, the mobile robot 106 may move to move or transport the cart 204. The mobile robot 106 may include any suitable mechanism for lifting or grabbing the cart 204 so that the mobile robot 106 may move or transport the cart 204. For example, the mobile robot 105 may include an arm or a grabber that grabs or lifts the cart 204. As another example, the mobile robot 106 may include a ramp that lifts the cart 204.

Figure 3:
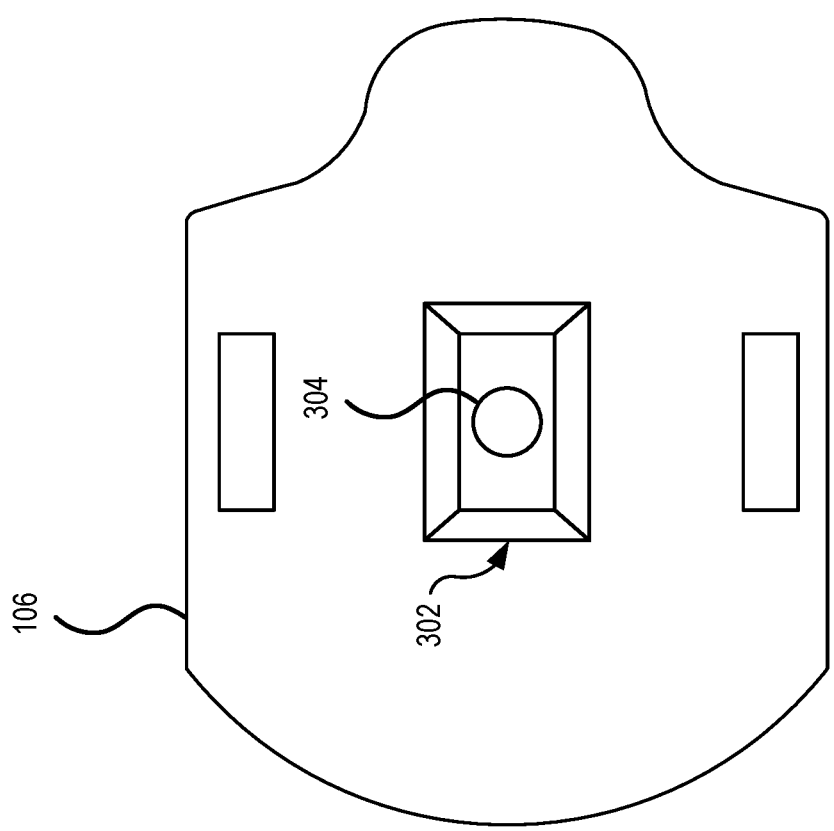
FIG. 3 illustrates an example of a bottom view of a mobile robot that can perform self-diagnostic fiducial classification, according to embodiments of the present disclosure.

The mobile robot 106 may include sensors used in navigation or other tasks. For example, FIG. 3 illustrates an example of a bottom view of a mobile robot 106 that can perform self-diagnostic fiducial classification, according to embodiments of the present disclosure. The mobile robot 106 can include a floor-facing optical sensor 304 (e.g., a camera) in a camera well 302. The optical sensor 304 may detect images of the floor beneath the mobile robot 106 as the mobile robot travels in the facility. When the mobile robot 106 passes over a fiducial marker attached to the floor, the optical sensor 304 may detect an image of the fiducial marker.

In some examples, debris may become stuck in the camera well 302 or the optical sensor 304. A machine learning model executed by the mobile robot 106 may be trained to differentiate between and classify images of obscured fiducial markers caused by debris on the floor or by debris stuck in the camera well 302 and/or optical sensor 304. In some examples, the mobile robot 106 may include additional sensors, such as sensors that can detect a weight of a load transported by the mobile robot 106, deformation sensors on a load cell of the mobile robot 106, line break sensors, accelerometer sensors, or any other suitable sensors.

Figure 4:
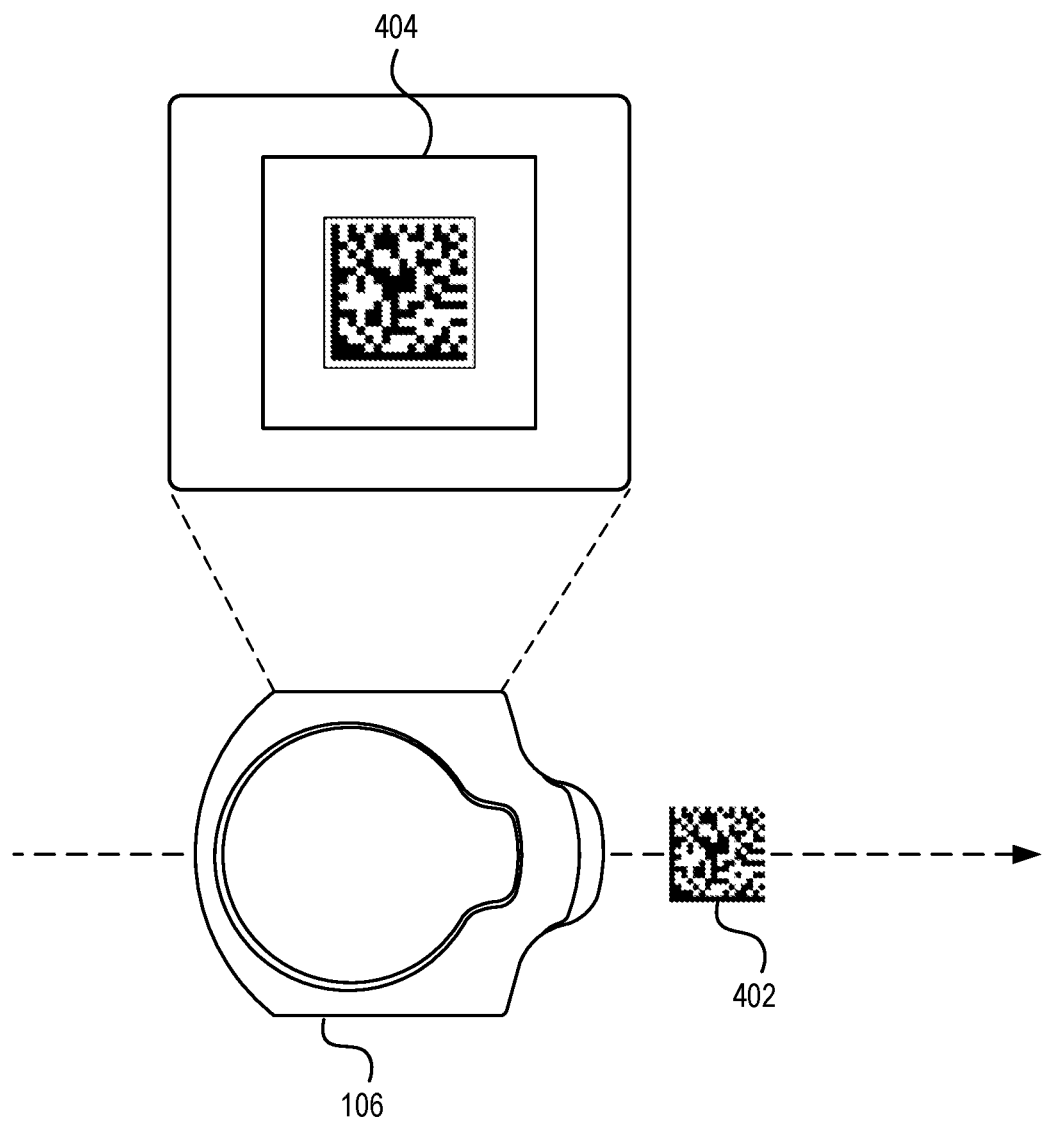
FIG. 4 illustrates an example of a mobile robot performing self-diagnostic fiducial classification, according to embodiments of the present disclosure.

FIG. 4 illustrates an example of a mobile robot 106 performing self-diagnostic fiducial classification, according to embodiments of the present disclosure. The mobile robot 106 may pass over fiducial marker 402 and capture image(s) 404. But, the mobile robot 106 may not detect the fiducial marker 402 in the image 404 as expected. Thus, the mobile robot 106 may input the image 404 into a trained machine learning model executed by the mobile robot 106. The machine learning model can output a classification of the image 404 indicating an error event for the fiducial marker 402. The machine learning model can output this classification when the machine learning model generates a confidence score for the classification that exceeds a predetermined threshold (e.g., a 90% confidence score, 95% confidence score, 98% confidence score, etc.). This error event for the fiducial marker 402 determined from the classification can be output as a notification by the mobile robot 106 to another computer system, such as a computer or tablet used by an operator of the facility.

In some examples, the notification can also include a recommendation to address the cause of the "missed" fiducial marker 402. For example, because the machine learning model classified the image 404 as including a readable fiducial marker but the mobile robot 106 did not detect the fiducial marker 402 as expected, this may indicate a malfunction with detection software for the mobile robot 106. If multiple such events occur, the mobile robot 106 may transmit a notification indicating a potential detection software failure to the computer system used by the operator.

Figure 5:
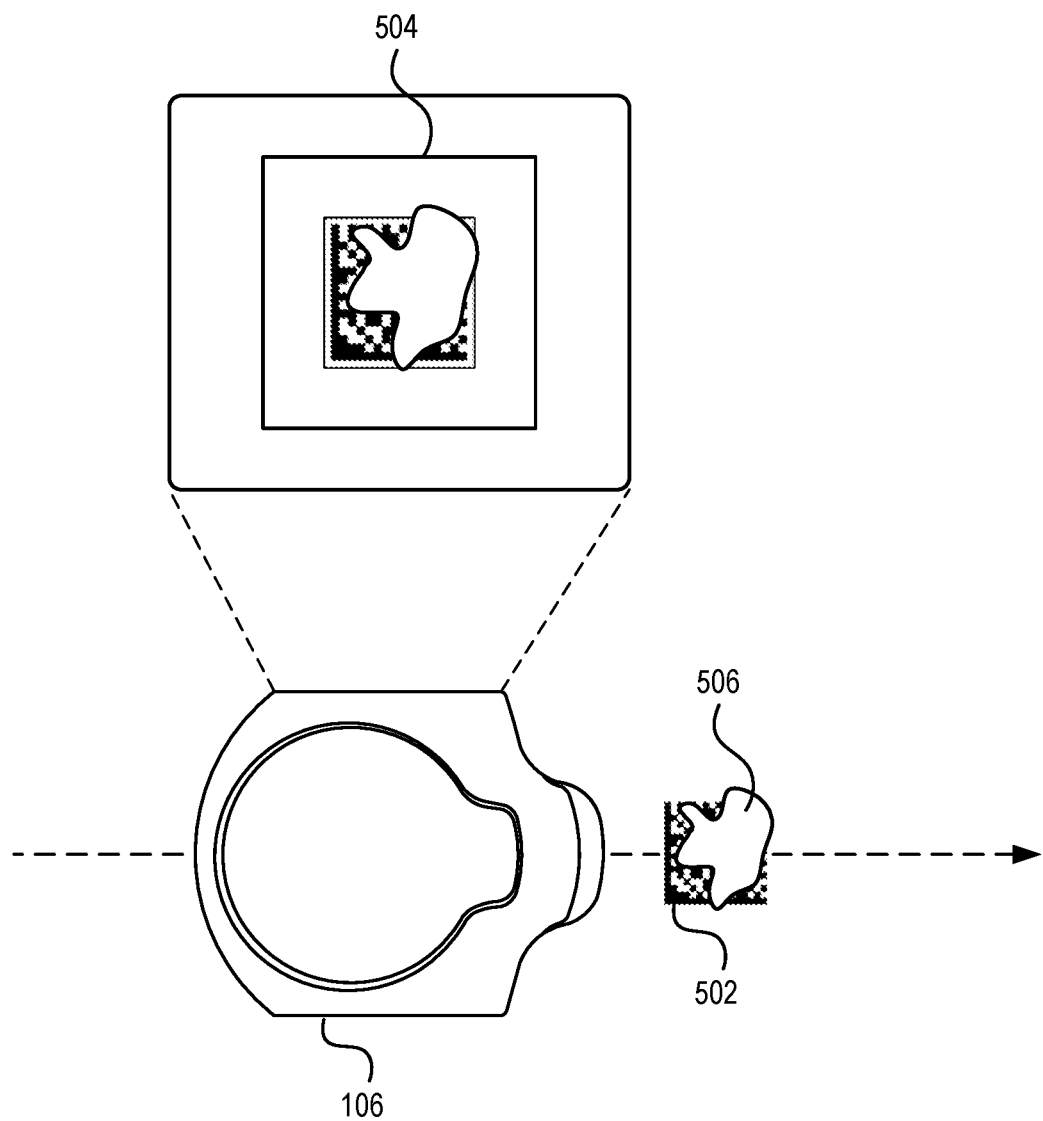
FIG. 5 illustrates another example of a mobile robot performing self-diagnostic fiducial classification, according to embodiments of the present disclosure.

FIG. 5 illustrates another example of a mobile robot 106 performing self-diagnostic fiducial classification, according to embodiments of the present disclosure. The mobile robot 106 may pass over fiducial marker 502 and capture image(s) 504. But, the mobile robot 106 may not detect the fiducial marker 502 in the image 504 as expected. Thus, the mobile robot 106 may input the image 504 into a trained machine learning model executed by the mobile robot 106. The machine learning model can output a classification of the image 504 indicating an error event involving a presence of debris 506 covering the fiducial marker 502. In some examples, the machine learning model may be trained to identify a type of debris 506, such as a liquid spill as depicted in FIG. 5. This error event determined from the classification can be output as a notification by the mobile robot 106 to another computer system, such as a computer or tablet used by an operator of the facility.

In some examples, the notification can also include a recommendation to address the cause of not detecting the fiducial marker 502. For example, because the machine learning model classified the image 504 as including an obscured fiducial marker 502, as well as the type of debris 506 obscuring the fiducial marker 502, the mobile robot 106 can transmit a notification recommending that the debris 506 be removed from the fiducial marker 502. The notification can include the location of the debris 506.

Figure 6:
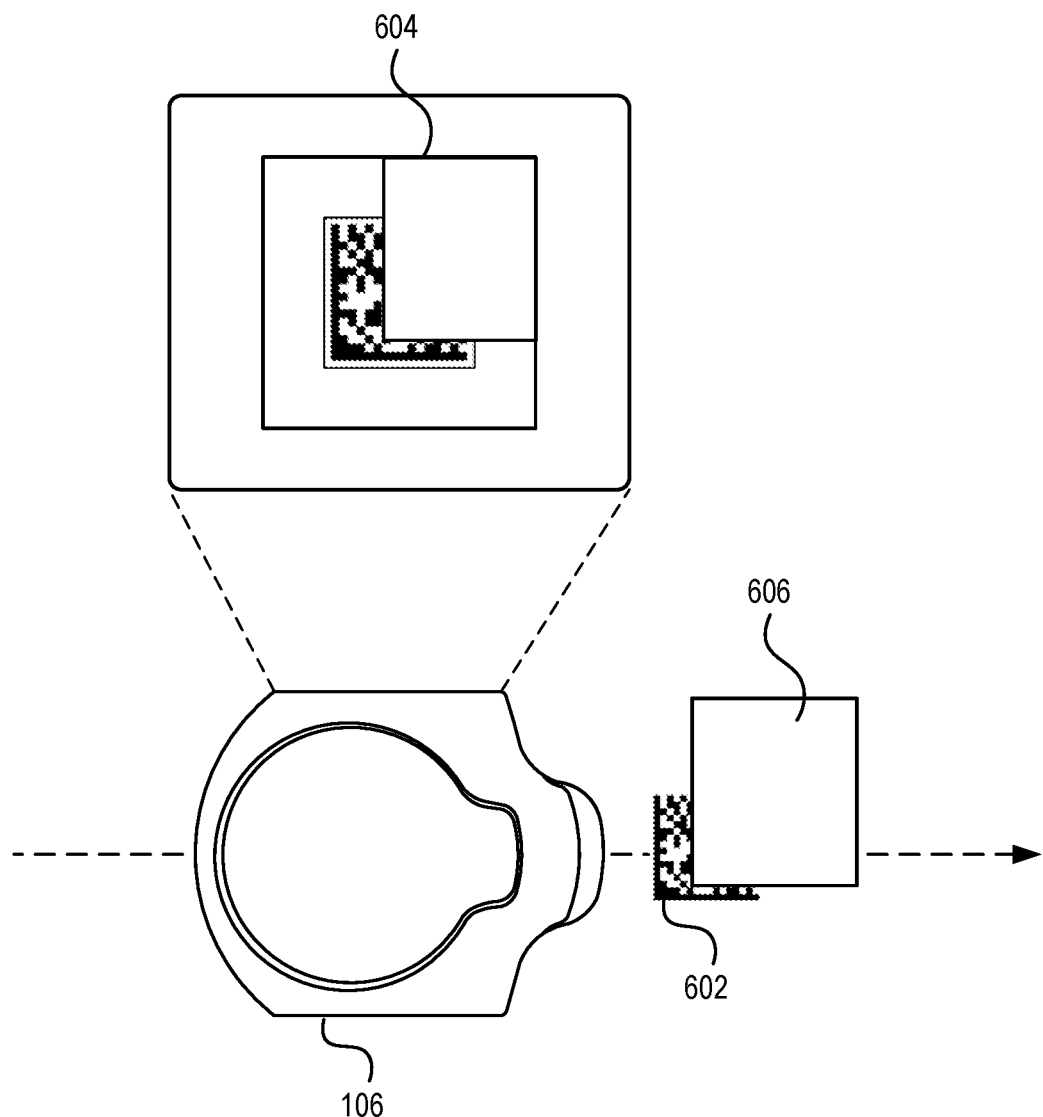
FIG. 6 illustrates another example of a mobile robot performing self-diagnostic fiducial classification, according to embodiments of the present disclosure.

FIG. 6 illustrates another example of a mobile robot 106 performing self-diagnostic fiducial classification, according to embodiments of the present disclosure. The mobile robot 106 may pass over fiducial marker 602 and capture image(s) 604. But, the mobile robot 106 may not detect the fiducial marker 602 in the image 604 as expected. Thus, the mobile robot 106 may input the image 604 into a trained machine learning model executed by the mobile robot 106. The machine learning model can output a classification of the image 604 indicating an error event involving a presence of debris 606 covering the fiducial marker 602. The machine learning model can output this error event when the machine learning model generates a confidence score for the classification that exceeds a predetermined threshold. In some examples, the machine learning model may be trained to identify a type of debris 606, such as a package (e.g., a box) as depicted in FIG. 6. Other types of debris that can be classified by the machine learning model can include solid debris, liquid debris, product bags, product boxes, etc. The error event determined from the classification can be output as a notification by the mobile robot 106 to another computer system, such as a computer or tablet used by an operator of the facility.

In some examples, the notification can also include a recommendation to address the cause of the error event (e.g., not detecting the fiducial marker 602). For example, because the machine learning model classified the image 604 as including an obscured fiducial marker 602, as well as the type of debris 606 obscuring the fiducial marker 602, the mobile robot 106 can transmit a notification recommending that the debris 606 be removed from the fiducial marker 602. The notification can include the location of the debris 606.

In some examples, the machine learning model can be used to aid in automatic detection and notification of product falling from the mobile robot 106. For example, the mobile robot 106 may include a sensor that can detect a weight of product carried by the mobile robot 106. If the detected weight suddenly decreases (e.g., by more than a threshold amount), this may indicate that product has fallen off of the mobile robot 106. To determine if the mobile robot 106 has run over fallen product, the mobile robot 106 can automatically generate input to the machine learning model. The machine learning model may include the images as well as additional sensor data. If the classification output by the machine learning model indicates the presence of debris in the camera well of the mobile robot 106 or on the floor, this can confirm that product has been dropped. The mobile robot 106 can transmit notifications alerting operators of the dropped product. Other sensor data detected by the mobile robot 106 may additionally prompt generation of input into the machine learning model. For example, the machine learning model may be used to automatically detect physical variants in mechanical chassis construction (e.g., wheel diameter, wheel track, wheel hardness, wheel surface friction) based on a presence or absence of fiducial markers in images.

Figure 7:
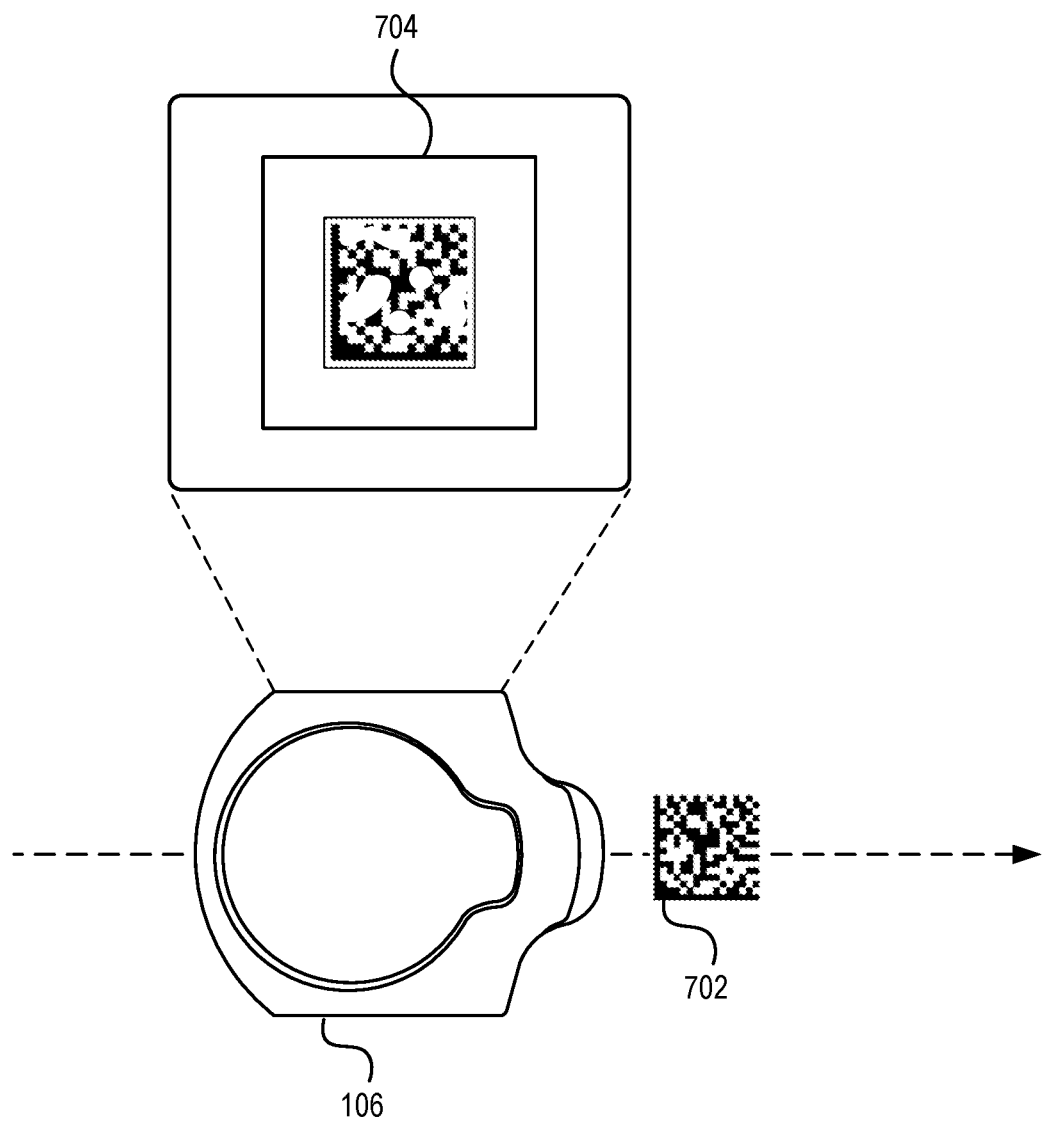
FIG. 7 illustrates another example of a mobile robot performing self-diagnostic fiducial classification, according to embodiments of the present disclosure.

FIG. 7 illustrates another example of a mobile robot 106 performing self-diagnostic fiducial classification, according to embodiments of the present disclosure. The mobile robot 106 may pass over fiducial marker 702 and capture image(s) 704. But, the mobile robot 106 may not detect the fiducial marker 702 in the image 704 as expected. Thus, the mobile robot 106 may input the image 704 into a trained machine learning model executed by the mobile robot 106. The machine learning model can output a classification of the image 704 indicating an error event involving the fiducial marker 702 being unreadable due to a presence of debris 706 in a camera well of the mobile robot 106. For example, dust or other debris (e.g., liquid debris, paper, shrink wrap, ripped fiducial marker stickers) may be stuck within the camera well or onto the camera. This can cause distortions in the image 704, preventing the mobile robot 106 from detecting the fiducial marker 702. The machine learning model can output this classification when the machine learning model generates a confidence score for the classification that exceeds a predetermined threshold.

In some examples, the machine learning model may be trained to identify a type of the debris on the mobile robot 106. The machine learning model may also differentiate between debris on the facility floor and debris stuck to the mobile robot 106. The error event determined from the classification can be output as a notification by the mobile robot 106 to another computer system, such as a computer or tablet used by an operator of the facility. In some examples, the notification can also include a recommendation to address the cause of not detecting the fiducial marker 702. For example, because the machine learning model classified the image 704 as including an obscured fiducial marker 702, as well as the type of debris obscuring the camera in the mobile robot 106, the mobile robot 106 can transmit a notification recommending that the debris 606 be removed from the mobile robot 106. In some examples, the notification may be sent after detecting multiple instances of missed fiducial markers due to debris in the camera well.

Figure 8:
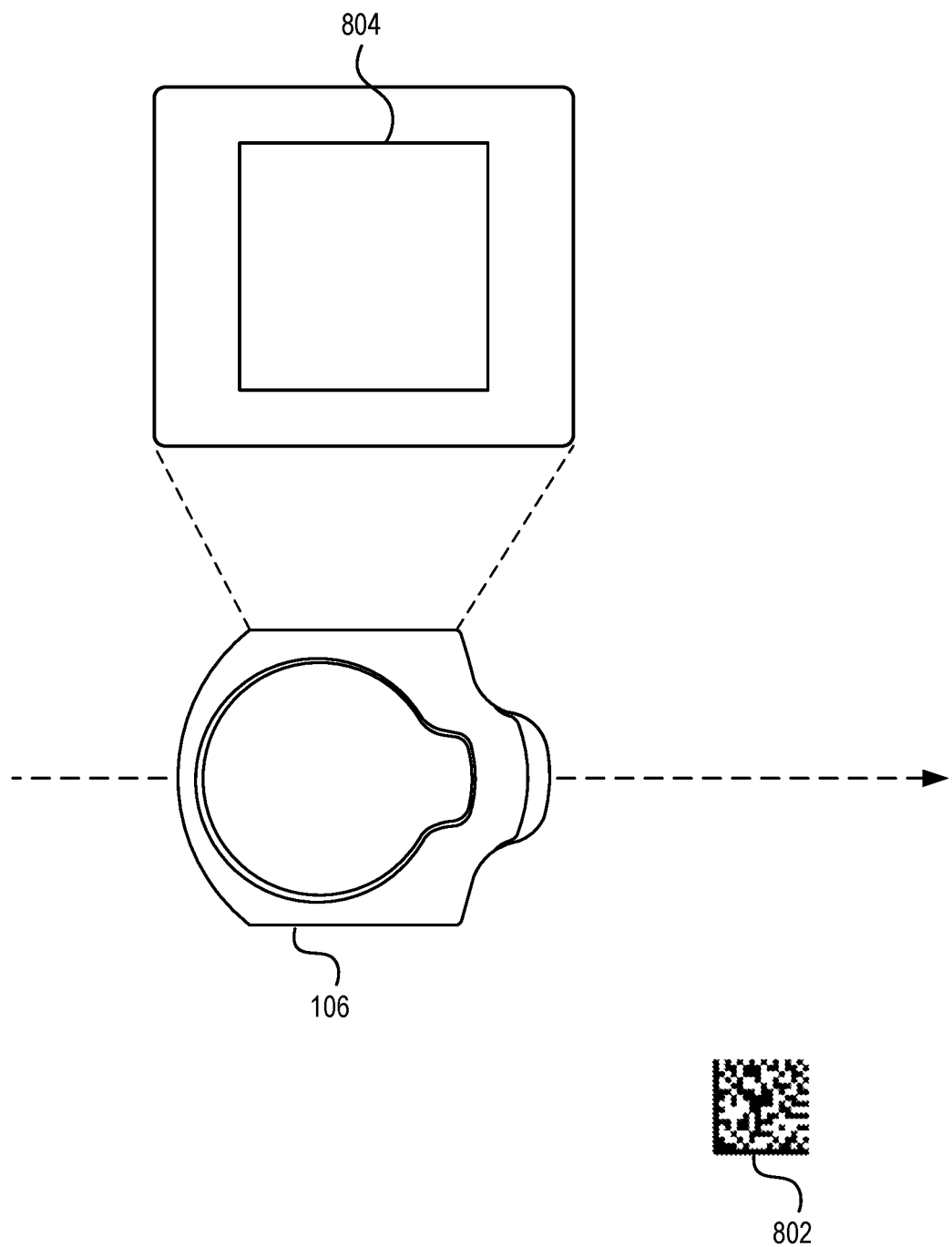
FIG. 8 illustrates another example of a mobile robot performing self-diagnostic fiducial classification, according to embodiments of the present disclosure.

FIG. 8 illustrates another example of a mobile robot 106 performing self-diagnostic fiducial classification, according to embodiments of the present disclosure. The mobile robot 106 may attempt to pass over fiducial marker 802 and may capture image(s) 804. But, the mobile robot 106 may not detect the fiducial marker 802 in the image 804 as expected due to a navigational error. Thus, the mobile robot 106 may input the image 804 into a trained machine learning model executed by the mobile robot 106. The machine learning model can output a classification of the image 804 indicating an error event involving the fiducial marker 802 being absent from the image 804. The machine learning model can output this classification when the machine learning model generates a confidence score for the classification that exceeds a predetermined threshold. This error event determined from the classification can be output as a notification by the mobile robot 106 to another computer system, such as a computer or tablet used by an operator of the facility.

In some examples, the notification can also include a recommendation to address the cause of not detecting the fiducial marker 802. For example, because the machine learning model classified the image 804 as being absent of fiducial marker 802, the mobile robot 106 can transmit an indication recommending that the mobile robot 106 be placed at the correct location. An absent fiducial marker 802 may also indicate a missing fiducial marker 802 that has been removed or damaged to a point that prevents detection. Multiple notifications that the fiducial marker 802 has not been detected may be used to determine that issues are being caused by a missing fiducial marker 802 rather than many navigational errors by different mobile robots.

Figure 9:
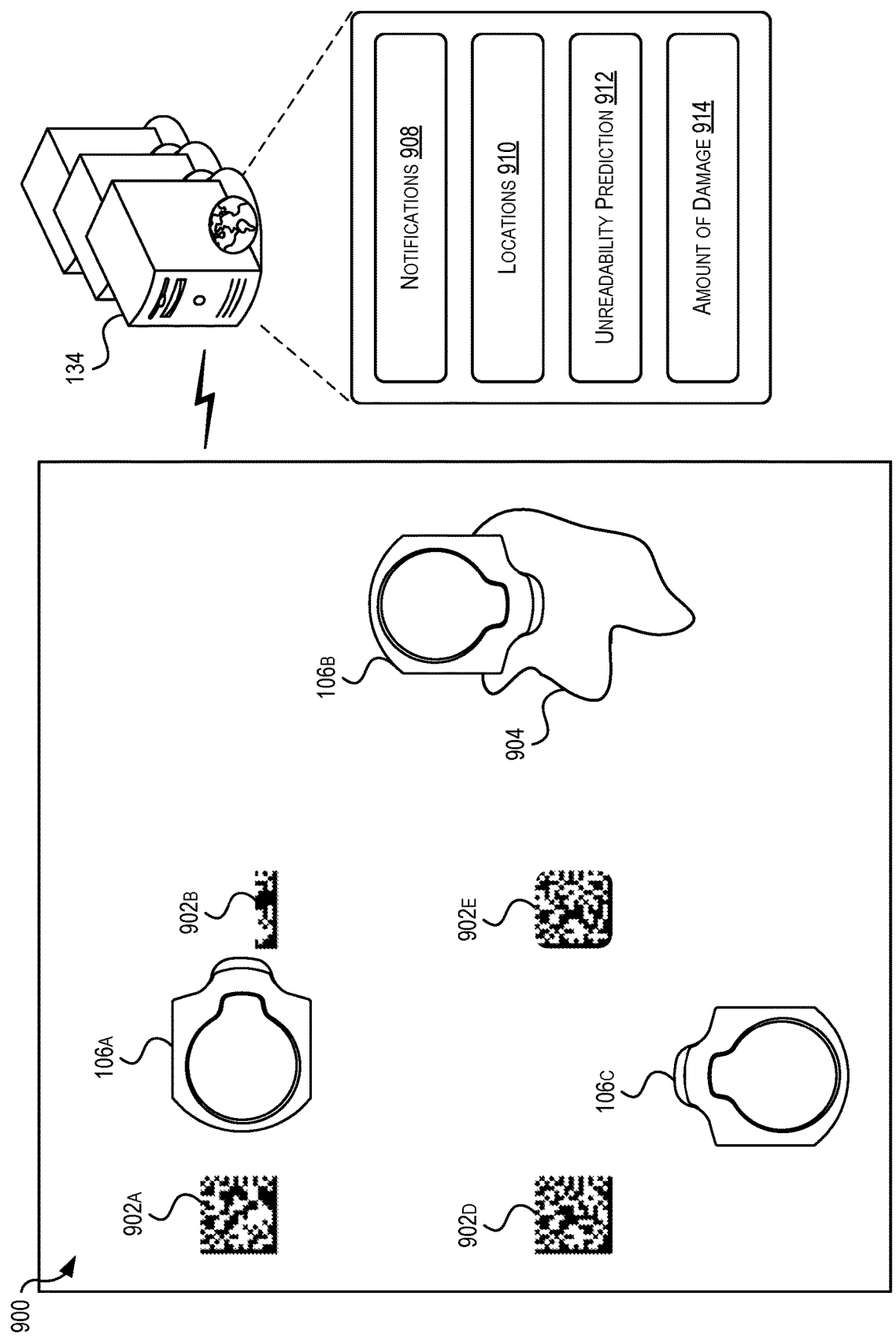
FIG. 9 illustrates an example of a computer system for aggregating self-diagnostic fiducial classification for mobile robots in a facility, according to embodiments of the present disclosure.

FIG. 9 illustrates an example of a computer system 134 for aggregating self-diagnostic fiducial classification for mobile robots 106a-c in a facility 900, according to embodiments of the present disclosure. Aggregating the fiducial classifications produced by individual mobile robots 106a-c can aid in determining whether fiducial markers are not being detected due to individual mobile robot navigation error or because the fiducial markers have been removed from the floor of the facility 900. The facility 900 can include fiducial markers 902a-e that can provide navigational information (e.g., global position) to mobile robots 106a-c traversing the facility 900.

When a mobile robot 106 does not detect a particular fiducial marker 902 as expected, the mobile robot 106 may input images of the floor into a local machine learning model (e.g., a neural network) to determine a classification of image data. For example, the first mobile robot 106a may expect to detect second fiducial marker 902b, but may not detect image data depicting the second fiducial marker 902b. Recently captured images can be input into the machine learning model, which can output a classification indicating that the image data depicts a damaged fiducial marker. This is because the second fiducial marker 902b may be partially ripped away. Therefore, the first mobile robot 106a may output a notification 908 to an external computer system 134 indicating that the second fiducial marker 902b is damaged and needs to be repaired or replaced. In another example, the second mobile robot 106b may be unable to detect an expected fiducial marker. Recently captured images can be input into the machine learning model, which can output a classification of the image data as including a liquid debris spill. This liquid debris spill may be covering the expected fiducial marker. Therefore, the second mobile robot 106b may output a notification 908 to an external computer system 134 indicating that the expected fiducial marker at the location of the second mobile robot 106b may be covered with debris that needs to be removed. In another example, the third mobile robot 106c may expect to detect fourth fiducial marker 902d, but may not detect image data depicting fourth fiducial marker 902d. Recently captured images can be input into the machine learning model, which can output a classification of the image data as including an absent fiducial marker. This may be because fourth fiducial marker 902d is missing or because the third mobile robot 106c has navigated to an incorrect location. Therefore, the third mobile robot 106c may output a notification 908 to an external computer system 134 indicating that the fourth fiducial marker 902d has not been detected by the third mobile robot 106c. Each of the notifications 908 output by the mobile robots 106a-c may also include locations 910 of the mobile robots 106a-c and/or the relevant fiducial markers 902a-e.

In some examples, aggregating these notifications 908 from individual mobile robots 106 may aid in determining mitigation operations to address undetected fiducial markers 902. For example, the third mobile robot 106c may repeatedly send notifications 908 indicating absent fiducial markers, such as an absent fourth fiducial marker 902d and an absent first fiducial marker 902a. Meanwhile, other mobile robots (e.g., the first mobile robot 106a and/or the second mobile robot 106b) may successfully navigate using the first fiducial marker 902a and the fourth fiducial marker 902d. Because other mobile robots are not having issues detecting these fiducial markers, and because the third mobile robot 106c is repeatedly having issues detecting fiducial markers, the computer system 134 may determine that the third mobile robot 106c is experiencing navigational difficulties. The computer system 134 can therefore notify an operator to reposition the third mobile robot 106c in the correct location or perform further inspections on the third mobile robot 106c.

Repeated notifications 908 for the same error event with the same fiducial marker 902 can additionally be aggregated to determine mitigation operations. For example, the damaged second fiducial marker 902b can be determined as requiring replacement after a threshold number of mobile robots transmit notifications 908 of damage. Similarly, after multiple mobile robots transmit notifications 908 of liquid debris spill, the computer system 134 can issue a work order to clean up the liquid debris. The computer system 134 can determine a location of the debris or the damaged fiducial marker based on the notifications 908.

In some examples, the machine learning models executed on the mobile robots 106a-c may be further trained to generate unreadability predictions 912 and amounts of damage 914 for fiducial markers 902a-e based on image data. For example, the first mobile robot 106a may estimate, based on output from the machine learning model, that 70% of the second fiducial marker 902b has been ripped away. This amount of damage 914 can be transmitted to the computer system 134. The amount of damage 914 may also be classified by the machine learning model as a type of damage, such as spill damage from liquid debris or rip damage from being ripped off the floor. In some examples, the first mobile robot 106a can further determine an unreadability prediction 912 based on the output and the amount of damage 914. For example, if a fiducial marker 902 may be readable but may be classified as damaged due to a corner being ripped up. The output from the machine learning model may therefore indicate an unreadability prediction 912 indicating that the fiducial marker 902 may soon be damaged to the point of unreadability (e.g., the rest of the sticker may soon be ripped up as mobile robots 106 continue to pass over the damaged corner). These unreadability predictions 912 and amounts of damage 914 output by individual mobile robots 106a-c can be aggregated by the computer system 134 to determine when and where operators should be instructed to replace fiducial markers 902.

Although many of the fiducial markers 902 depicted in the present disclosure are square shaped, in other examples any other shape or type of fiducial marker 902 may be used. The machine learning models executed by the mobile robots 106 may be trained to identify and classify fiducial markers of any shape. In an example, the machine learning model may be trained to identify and classify fiducial markers with rounded corners, such as fifth fiducial marker 902e. Such rounded fiducial markers may be more resistant to being ripped up by mobile robots passing overhead.

FIG. 10 is an example flowchart showing a process for implementing techniques related to mobile robots performing self-diagnostic fiducial classification, according to embodiments of the present disclosure. In some examples, the mobile robots 106 of FIGS. 1-9, the computer system 134 of FIGS. 1 and 9, the fiducial classifier engine 1110 of FIG. 11, or the system 1200 of FIG. 12 may perform some or all parts of the process 1000.

The process 1000 begins at block 1002 by determining that an expected fiducial marker has not been detected by a mobile robot navigating via a plurality of fiducial markers positioned on a surface (e.g., a floor). Each fiducial marker may indicate a global position of the respective fiducial markers to the mobile robot. The mobile robot may include an optical sensor, such as a floor-facing optical sensor that can obtain images of the floor, including images of fiducial markers. Additionally or alternatively, the optical sensor may be positioned at other locations on the mobile robot to obtain images of fiducial markers on other surfaces besides the floor (e.g., on a wall). The mobile robot may navigate the floor based at least in part on determining the global position of the mobile robot from the images of fiducial markers. The mobile robot may expect to detect particular fiducial markers during navigation. Determining that an expected fiducial marker has not been detected may indicate an issue with the mobile robot, the expected fiducial marker, or the floor.

At block 1004, the process 1000 includes generating an input executed on the mobile robot. The input can comprise one or more images of the surface captured by the mobile robot. The machine learning model may be trained to generate an output comprising a classification of image data of the one or more images based at least in part on the input. In some examples, the machine learning model may be a neural network and may be executed locally by the mobile robot. The mobile robot may generate the input by selecting a predetermined number of images most recently captured by the mobile robot prior to determining that the expected fiducial marker has not been detected. Additionally or alternatively, the mobile robot may select images captured within a predetermined amount of time prior to determining that the expected fiducial marker has not been detected, or any other set of images corresponding to the expected fiducial marker. The mobile robot may then down sample the selected images to generate the input. In some examples, the input may also be generated in response to detecting input from other sensors on the mobile robot. For example, a first sensor on the mobile robot may detect that a weight of a load transported by the mobile robot has decreased by more than a threshold amount. This can cause the mobile robot to generate the input. In some examples, the input may comprise the additional sensor data from the first sensor.

At block 1006, the process 1000 includes determining an error event corresponding to the expected fiducial marker based at least in part on the classification of image data received from the machine learning model. The machine learning model may classify the image data based on confidence scores generated by the machine learning model. In some examples, the machine learning model can generate the output comprising the classification by classifying the image data as including at least one of a present fiducial marker, a partially present fiducial marker, or an absent fiducial marker. The mobile robot can determine the error event based at least in part on the classification of the image data. In some examples, at least some of the fiducial markers may have rounded corners. The machine learning model may be trained to generate the output classifying image data with fiducial markers that have rounded corners.

The mobile robot may determine the error event by determining a presence of debris in the mobile robot that is obscuring the floor-facing optical sensor, based at least in part on the confidence score for the classification exceeding a confidence threshold. In another example, based on the confidence score for the classification output by the machine learning model, the mobile robot may determine an error event of a presence of debris obscuring the expected fiducial marker on the floor in the one or more images. Or, based on the confidence score for the classification output by the machine learning model, the mobile robot may determine an error event of an absence of the expected fiducial marker on the floor in the one or more images.

In some examples, the image data may be classified as including debris. The machine learning model can generate the output by classifying the debris in the image data as including at least one of solid debris, liquid debris, a product bag, or a product box. The machine learning model may also generate the output by classifying the debris in the image data as including at least one of debris on the floor or debris obstructing a sensor in the mobile robot.

In some examples where the input to the machine learning model is generated in response to detecting that the weight of the load transported by the mobile robot has decreased by more than the threshold amount, the mobile robot may determine a presence of debris int eh one or more images based at least in part on the classification of image data received from the machine learning model. The mobile robot can then determine that the debris in the one or more images comprises product from the load transported by the mobile robot.

The classification may indicate that a fiducial marker in the one or more images is damaged. The machine learning model may be trained to generate an output that includes an amount of damage to the damaged fiducial marker. In some examples, the machine learning model may be further trained to output a type of damage to the damaged fiducial marker, such as at least one of a spill damage or a rip damage. The machine learning model may also be trained to generate output including an unreadability prediction for the damaged fiducial marker.

At block 1008, the process 1000 includes outputting the error event (e.g., presence of debris in the mobile robot obscuring the optical sensor, presence of debris obscuring the expected fiducial marker on the floor, absence of the expected fiducial marker on the floor, etc.) corresponding to the expected fiducial marker.

In some examples, the image data may be classified as a first absent fiducial marker, and the one or more images may be a first set of images captured at a first time. The mobile robot may then determine, based at least in part on another output received from the machine learning model in response to inputting a second set of images captured at a second time, a second absent fiducial marker. The mobile robot may then output a notification indicating a navigation error event for the mobile robot based at least in part on determining the first absent fiducial marker and the second absent fiducial marker.

In some examples, a computer system can be operably coupled with the mobile robots and other mobile robots traversing the floor. The mobile robot can receive notifications from the multiple mobile robots indicating error events of undetected fiducial markers. The computer system can aggregate this data to determine a location of at least one of a missing fiducial marker or debris covering a fiducial marker. The computer system can then output an instruction to perform at least one of replacing the missing fiducial marker or removing the debris covering the fiducial marker.

Figure 11:
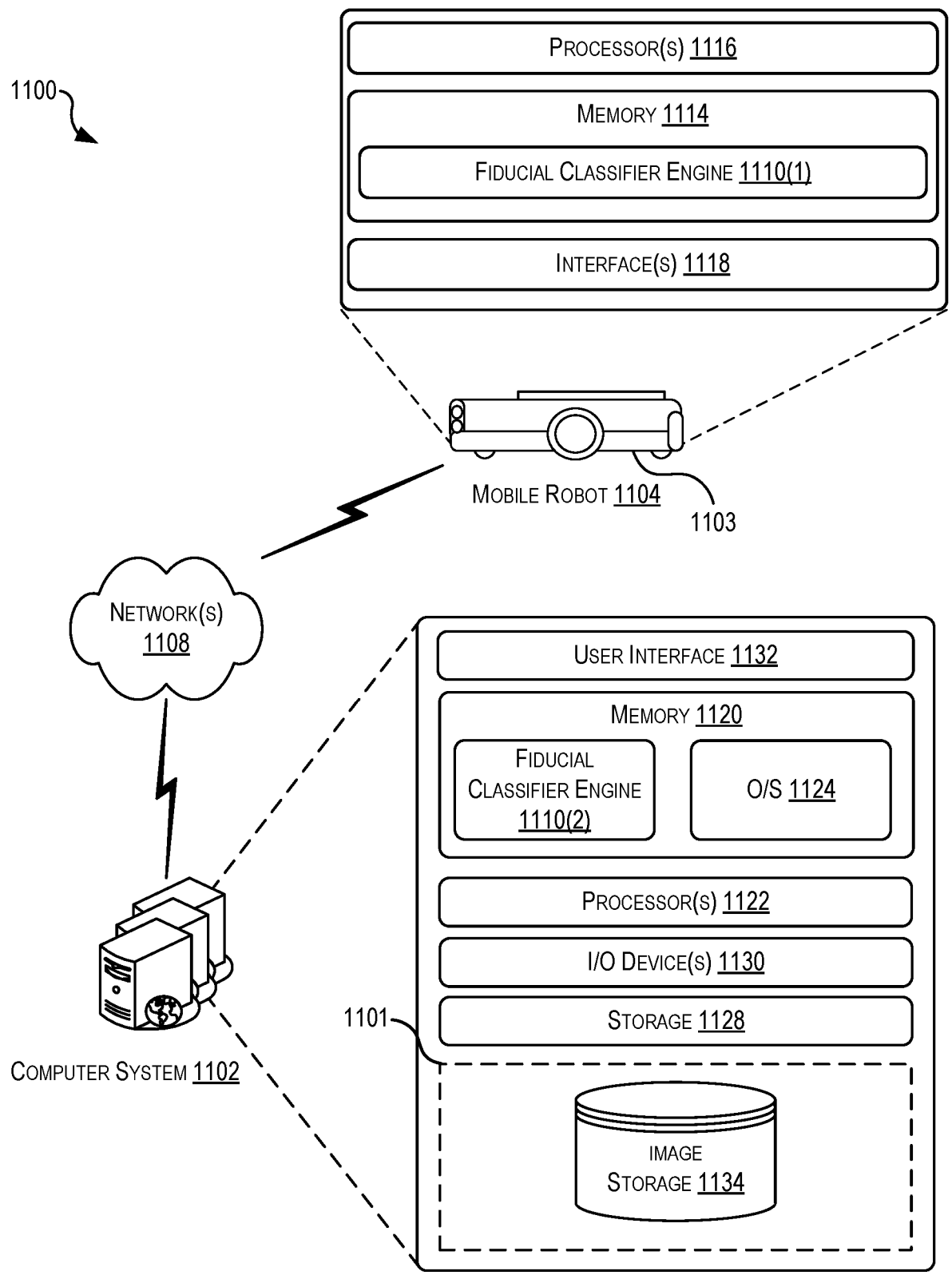
FIG. 11 illustrates an example schematic architecture for implementing techniques related to mobile robots performing self-diagnostic fiducial classification, according to embodiments of the present disclosure.

FIG. 11 illustrates an example schematic architecture 1100 for implementing techniques related to mobile robots performing self-diagnostic fiducial classification, according to embodiments of the present disclosure. The architecture 1100 may include a computer system 1102 (e.g., the computer system 134 described herein) in communication with a mobile robot 1104 (e.g., the mobile robot 106 described herein) via one or more networks 1108 (hereinafter, "the network 1108").

The mobile robot 1104 may be operable to interact with the computer system 1102. The mobile robot 1104 may include a sensor device 1103 such as an optical sensor, a distance sensor, an RFID sensor, or any other type of sensor.

The mobile robot 1104 may include a memory 1114 and processor(s) 1116. In the memory 1114 may be stored program instructions that are loadable and executable on the processor(s) 1116, as well as data generated during the execution of these programs. Depending on the configuration and type of mobile robot 1104, the memory 1114 may be volatile (such as random access memory ("RAM")) and/or non-volatile (such as read-only memory (ROM), flash memory, etc.).

In some examples, the memory 1114 may include a version of a fiducial classifier engine 1110 (e.g., 1110(1)). The fiducial classifier engine 1110(1) may interact with the computer system 1102 via the network 1108. The mobile robot 1104 may also include one or more interfaces 1118 to enable communication with other devices, systems, and the like. The fiducial classifier engine 1110(1), whether embodied in the mobile robot 1104 or the computer system 1102, may be configured to perform the techniques described herein. For example, the fiducial classifier engine 1110 can include a machine learning model that can classify images of fiducial markers. In an example, the fiducial classifier engine 1110 can include any other suitable devices, engines, modules, models, and the like.

Turning now to the details of the computer system 1102, the computer system 1102 may include one or more computer system computers, perhaps arranged in a cluster of servers or as a server farm, and may host web service applications. The function of the computer system 1102 may be implemented a cloud-based environment such that individual components of the computer system 1102 are virtual resources in a distributed environment.

The computer system 1102 may include at least one memory 1120 and one or more processing units (or processor(s)) 1122. The processor 1122 may be implemented as appropriate in hardware, computer-executable instructions, software, firmware, or combinations thereof. Computer-executable instruction, software, or firmware implementations of the processor 1122 may include computer-executable or machine-executable instructions written in any suitable programming language to perform the various functions described. The memory 1120 may include more than one memory and may be distributed throughout the computer system 1102. The memory 1120 may store program instructions that are loadable and executable on the processor(s) 1122, as well as data generated during the execution of these programs. Depending on the configuration and type of memory including the computer system 1102, the memory 1120 may be volatile (such as RAM and/or non-volatile (such as read-only memory ("ROM"), flash memory, or other memory)). The memory 1120 may include an operating system 1124 and one or more application programs, modules, or services for implementing the features disclosed herein including at least a version of the fiducial classifier engine 1110 (e.g., 1110(2)). For example, the fiducial classifier engine 1110(2) may perform the functionality described herein.

The computer system 1102 may also include additional storage 1128, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1128, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1102 and/or part of the mobile robot 1104.

The computer system 1102 may also include input/output (I/O) device(s) and/or ports 1130, such as for enabling connection with a keyboard, a mouse, a pen, a voice input device, a touch input device, a display, speakers, a printer, or other I/O device.

In some examples, the computer system 1102 may also include one or more user interface(s) 1132. The user interface 1132 may be utilized by an operator, curator, or other authorized user to access portions of the computer system 1102. In some examples, the user interface 1132 may include a graphical user interface, voice interfaces, web-based applications, programmatic interfaces such as APIs, or other user interface configurations.

The computer system 1102 may also include a data store 1101. In some examples, the data store 1101 may include one or more databases, data structures, or the like for storing and/or retaining information associated with the computer system 1102 and which, in some examples, may be accessible by the mobile robot 1104. The fiducial classifier engine 1110 is communicatively coupled (e.g., via a wired connection or a wireless connection) to the data store 1101. The data store 1101 includes an image storage 1134. In an example, the data store 1101 can include any other suitable data, databases, libraries, and the like. The image storage 1134 can include images of a facility floor, such as images depicting fiducial markers.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a plurality of fiducial markers positionable on a floor, each fiducial marker of the plurality of fiducial markers configured to indicate a global position of the respective fiducial marker for use in navigating the floor; and
   a mobile robot comprising a floor-facing optical sensor, wherein the mobile robot is configured to:
   obtain, via the floor-facing optical sensor, first images of the floor including the plurality of fiducial markers;
   navigate the floor based at least in part on determining the global position of the mobile robot from the first images of the plurality of fiducial markers;

determine that an expected fiducial marker has not been detected in the first images of the plurality of fiducial markers;

responsive to determining that the expected fiducial marker has not been detected, generate an input to a neural network comprising one or more images of the first images detected by the floor-facing optical sensor when the mobile robot was proximate the expected fiducial marker, the neural network configured to execute locally by the mobile robot and configured to generate an output comprising a classification of image data of the one or more images based at least in part on the input;

determine an error event corresponding to the expected fiducial marker based at least in part on the classification of image data received from the neural network; and responsive to determining the error event, output a notification indicating the error event corresponding to the expected fiducial marker.

2. The system of claim 1, wherein the mobile robot is further configured to:

determine the error event by determining, based at least in part on a confidence score generated by the neural network, a presence of debris in the mobile robot and obscuring the floor-facing optical sensor; and outputting the notification indicating the presence of debris obscuring the floor-facing optical sensor.

3. The system of claim 1, wherein the mobile robot is further configured to:

determine the error event by determining, based at least in part on a confidence score generated by the neural network, a presence of debris obscuring the expected fiducial marker on the floor in the one or more images; and outputting the notification indicating the presence of debris obscuring the expected fiducial marker on the floor.

4. The system of claim 1, wherein the mobile robot is further configured to:

determine the error event by determining, based at least in part on a confidence 2 score generated by the neural network, an absence of the expected fiducial marker on the floor in the one or more images; and outputting the notification indicating the absence of the expected fiducial marker on the floor.

5. The system of claim 1, further comprising:

a computer system operably coupled with the mobile robot, the computer system configured to:

receive, from a plurality of mobile robot including the mobile robot, a plurality of notifications including the notification;

determine, based at least in part on the plurality of notifications, a location of at least one of a missing fiducial marker or debris covering a fiducial marker; and output an instruction to perform at least one of replacing the missing fiducial marker or removing the debris covering the fiducial marker.

6. A computer-implemented method, comprising:

determining that an expected fiducial marker has not been detected by a mobile robot navigating via a plurality of fiducial markers including the expected fiducial marker positionable on a surface;

responsive to determining that the expected fiducial marker has not been detected, generating an input to a machine learning model configured to be executed on the mobile robot, the input comprising one or more images of the surface captured by the mobile robot, the machine learning model trained to generate an output comprising a classification of image data of the one or more images based at least in part on the input;

determining an error event corresponding to the expected fiducial marker based at least in part on the classification of image data received from the machine learning model; and outputting a notification indicating the error event corresponding to the expected fiducial marker.

7. The computer-implemented method of claim 6, wherein the machine learning model is configured to generate the output comprising the classification of image data by generating a confidence score for each class of image data, and wherein the method further comprises determining the error event corresponding to the expected fiducial marker based at least in part on determining that the confidence score for a particular class of image data exceeds a confidence threshold.

8. The computer-implemented method of claim 6, wherein the machine learning model is configured to generate the output comprising the classification by:

classifying the image data as comprising at least one of a present fiducial marker, debris, a partially present fiducial marker, or an absent fiducial marker, wherein the method further comprises determining the error event based at least in part on classifying the image data as comprising at least one of debris, the partially present fiducial marker, or the absent fiducial marker.

9. The computer-implemented method of claim 8, wherein the image data is classified as comprising debris, and wherein the machine learning model is configured to generate the output by:

classifying the debris in the image data as comprising at least one of: solid debris, liquid debris, a product bag, or a product box.

10. The computer-implemented method of claim 8, wherein the image data is classified as comprising debris, and wherein the machine learning model is configured to generate the output by:

classifying the debris in the image data as comprising at least one of debris on the surface or debris obstructing a sensor in the mobile robot.

11. The computer-implemented method of claim 8, wherein the image data is classified as the absent fiducial marker, wherein the one or more images are a first set of images captured at a first time and the expected fiducial marker is a first expected fiducial marker, and wherein the method further comprises:

determining, based at least in part on another output received from the machine learning model in response to inputting a second set of images captured at a second time, a second error event corresponding to a second expected fiducial marker that was not detected by the mobile robot; and outputting another notification indicating a navigation error event for the mobile robot based at least in part on determining the first absent fiducial marker and the second absent fiducial marker.

12. The computer-implemented method of claim 6, wherein generating the input to the machine learning model comprises generating the input in response to detecting, via a first sensor, that a weight of a load transported by the mobile robot has decreased by more than a threshold amount.

13. The computer-implemented method of claim 12, further comprising:
   determining a presence of debris in the one or more images based at least in part on the classification of the image data received from the machine learning model; and
   determining that the debris in the one or more images comprises product from the load transported by the mobile robot.

14. The computer-implemented method of claim 6, wherein generating the input to the machine learning model further comprises:
   selecting one of (i) a predetermined number of images most recently captured by the mobile robot prior to determining that the expected fiducial marker has not been detected or (ii) images captured within a predetermined amount of time prior to determining that the expected fiducial marker has not been detected; and
   down sampling the selected images to generate the input.

15. The computer-implemented method of claim 6, wherein the machine learning model is a neural network.

16. A mobile robot comprising:
   a sensor configured to collecting image data of a surface on which a plurality of fiducial markers is positioned;
   one or more processors; and
   a memory having executable code stored thereon that, when executed by the one or more processors, cause the one or more processors to at least:
      determine that an expected fiducial marker has not been detected by the mobile robot navigating via the plurality of fiducial markers including the expected fiducial marker;
      responsive to determining that the expected fiducial marker has not been detected, generate an input to a neural network configured to be executed on the mobile robot, the input comprising one or more images of the surface captured by the mobile robot, the neural network trained to generate an output classifying image data of the one or more images based at least in part on the input;
      determine an error event corresponding to the expected fiducial marker based at least in part on classification of image data received from the neural network; and
      output a notification indicating the error event corresponding to the expected fiducial marker.

17. The mobile robot of claim 16, wherein the classification comprises a damaged fiducial marker detected in the one or more images, and wherein the neural network is further trained to generate the output comprising an amount of damage to the damaged fiducial marker, and wherein the executable code comprises further code to cause the one or more processors to output the notification comprising the amount of damage.

18. The mobile robot of claim 17, wherein the neural network is further trained to generate the output comprising a type of damage to the damaged fiducial marker, the type of damage comprising at least one of a spill damage or a rip damage, and wherein the executable code comprises further code to cause the one or more processors to output the notification comprising the type of damage.

19. The mobile robot of claim 17, wherein the neural network is further trained to generate the output comprising an unreadability prediction for the damaged fiducial marker, and wherein the executable code comprises further code to cause the one or more processors to output the notification comprising the unreadability prediction.

20. The mobile robot of claim 16, wherein at least some of the plurality of fiducial markers have rounded corners, and wherein the neural network is further trained to generate the output classifying image data comprising fiducial markers having rounded corners.

* * * * *